United States Patent [19]

Kanatani et al.

[11] 4,165,465

[45] Aug. 21, 1979

[54] SYSTEM FOR CHECKING PRINTED CONDITION OF PRINTED SHEET MATTERS

[75] Inventors: Masataka Kanatani, Tokyo; Daikichi Awamura, Kawasaki, both of Japan

[73] Assignee: Toppan Printing Co., Ltd., Tokyo, Japan

[21] Appl. No.: 823,108

[22] Filed: Aug. 9, 1977

[30] Foreign Application Priority Data

Aug. 10, 1976 [JP] Japan ................................ 51/95182
Aug. 17, 1976 [JP] Japan ................................ 51/97967
Aug. 27, 1976 [JP] Japan ................................ 51/102235

[51] Int. Cl.[2] ............................................ G01N 21/30
[52] U.S. Cl. ...................................... 250/559; 250/548
[58] Field of Search ............... 101/DIG. 12, DIG. 15; 250/548, 566, 226, 559; 356/71

[56] References Cited

U.S. PATENT DOCUMENTS 2,840,372 6/1958 Alhand ................................ 250/548
3,480,785 11/1969 Aufderheide .......................... 356/71
3,915,090 10/1975 Horst et al. .................. 101/DIG. 12
4,023,040 5/1977 Weber ................................ 250/566

*Primary Examiner*—David C. Nelms
*Attorney, Agent, or Firm*—Weingarten, Maxham & Schurgin

[57] ABSTRACT

A system for checking the printed condition of a stack of multicolor printed sheets in which at least one corner of each of the sheets has a check mark including stripes corresponding to each color printed. A counting machine separates the sheets one by one and exposes the corner having the check mark so that a density signal generator can scan the mark by means of a photoelectric element by detecting reflected light therefrom produced by a strobe flash synchronized with the separating operation. The resulting density signal output is analyzed and processed by a density signal processor which generates a pulse output indicating the respective positions of the check mark stripes. A computer operates to inspect for presence of the pulse signal from the density signal processor and any time lag thereof to thereby detect missing print and shear in printing, respectively. The system output then indicates the sheet having the faulty print.

22 Claims, 14 Drawing Figures

SYSTEM FOR CHECKING PRINTED CONDITION OF PRINTED SHEET MATTERS

BACKGROUND OF THE INVENTION (1) Field of the Invention

The present invention relates to a system for checking printed condition, that is, missing print or shear in printing, (mis-registration), of multicolor printed sheet matters, and more particularly to an apparatus for checking printed condition of multicolor printed sheet matters in which a check mark is particularly provided on a corner of each printed matter to be checked which is turned over by a counting machine and upon the turning over, is scanned to process a signal obtained by the scanning with a computer system and to inspect printed condition of matters to be checked.

(2) Description of Prior Art

In the prior art, inspection of printed condition of multicolor printed sheet matters has been performed by various methods such as checks by register mark that check with turning over by hand printed sheet matters piled suitably after printing.

For this, the conventional inspection method is not efficient and is unreliable. In addition, personnel expenses increase and further, cost-reduction of the printed matters is prevented.

Although there has been developed in the prior art an apparatus for automatically processing such an inspection through the intermediary of electro-optical means, it has not been apparatus such that the printed matters can be positively checked one by one at high speed and so that it is easy in checking work and is wide in its application.

BRIEF SUMMARY OF THE INVENTION

In the light of the above circumstances, it is an object of the present invention to provide a system for checking printed condition of multicolor printed sheet matters in which the apparatus can solve the above conventional defects, and is high in efficiency without skip of inspection and in accuracy of inspection, is easy in checking work and is wide in application.

It is another object of the present invention to provide a system for checking printed condition of multicolor printed sheet matters in which the apparatus includes means which can detect positively slight shear in printing and which can generate a signal from which randomly generated noise can be separated at a step of signal processing, from a photoelectric element such as an image sensor, and means which inspects printed condition by processing a density signal which is an output of a photoelectric element, such as an image sensor receiving reflected light corresponding to the optical density of the color of a special check mark provided on each corner of printed matters to be inspected.

Accordingly, a system for checking printed condition of multicolor printed sheet matters according to the present invention includes the following apparatus means and check mark:

- a counting machine for separating one by one a corner of multicolor printed sheet matter which has a check mark corresponding to each color printed;
- a density signal generator such as a photoelectric element which scans the check mark separated and exposed by the counting machine to provide as an output a density signal of the check mark;
- a density signal processor which analyzes and processes the density signal from the density signal generator to generate a pulse which indicates each position of stripes constituting the above check mark;
- a computer which operates to inspect for presence of the pulse signal from the density signal processor and any time lag thereof to detect missing print or shear in printing; and
- an indicator which indicates the printed matter having the missing print or shear in printing detected by said computer, the density signal processor including circuit means for obtaining a base density signal from the density signal, differentiation circuit means for obtaining a primary differentiation signal by differentiating the density signal, circuit means for obtaining a boundary portion signal by clipping the obtained primary differentiation signal with said base density signal, circuit means for obtaining a secondary differentiation signal from the primary differentiation signal, circuit means for obtaining a boundary point signal from the obtained secondary differentiation signal, and circuit means for obtaining an output signal from the boundary portion signal and the boundary point signal to indicate a position at which density change is most acute between a printing area portion of the check mark and a base.

BRIEF DESCRIPTION OF THE DRAWINGS

In order that the invention may be more fully understood, preferred examples and supplementary features will now be described with reference to the accompanying drawings, in which.

DETAILED DESCRIPTION OF THE INVENTION

Figure 1:
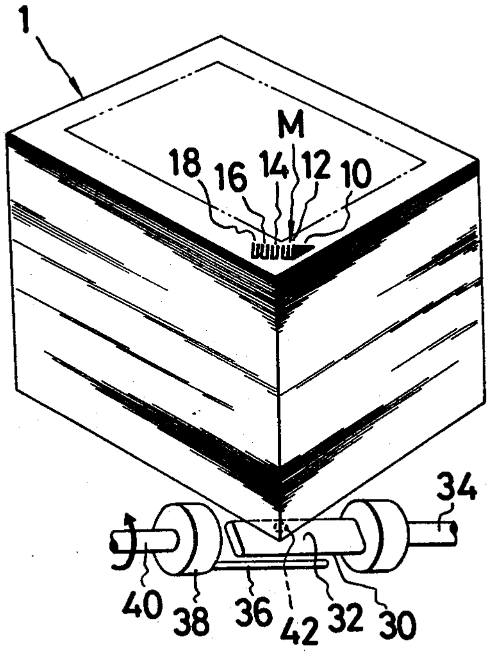
FIG. 1 is a perspective view showing a stack of printed sheet matters having corner check marks in alignment with a suction blade according to the invention.

The present invention will be now described in detail with reference to one embodiment shown in the accompanying drawings.

In FIGS. 1–6, there are shown printed sheet matters 1, and at a corner of each of the printed sheet matters is provided a check mark M which consists of a triangle pattern 10, and a series of sets of stripes 12, 14, 16 and 18 of two stripes each having a predetermined spacing and being at right angles to a scanning line 20. Each set of two stripes corresponds to a respective one of the printing colors on a printed sheet matter, and the stripes 12–18 are formed by print corresponding to each color. For example, the stripes 14 for checking print of cyan are formed by cyan print whereby missing print of cyan is checked by checking presence of the stripes 14, and a shear in printing is checked by checking whether the stripes 14 are in their determined positions to the basic stripes 12. A suction blade 30 of a counting machine N (see FIG. 8) is arranged opposite to the lower side of the corner which has the mark M and which is arranged and piled, and a flat surface 32 of the blade is caused to make rotary motion by means of a shaft 34 pivotably mounted on the counting machine N. A wiper pin 36 of the counting machine N is disposed parallel with the suction blade 30 and is adapted to continuously rotate in an arrow direction around the suction blade 30 while being not coaxial to the shaft 40 with a flange 38.

Figure 2:
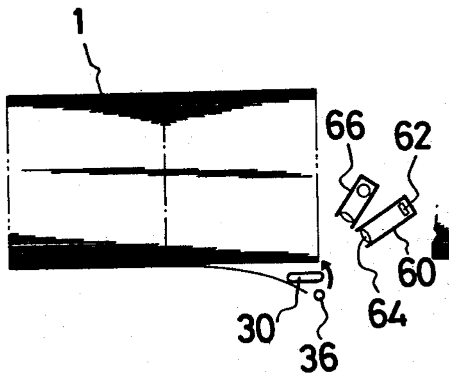
FIGS. 2 to 4 are schematic illustrations showing action of suction of the suction blade.
Figure 3:
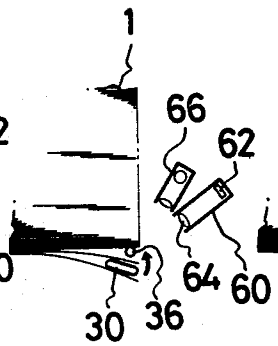
Figure 4:
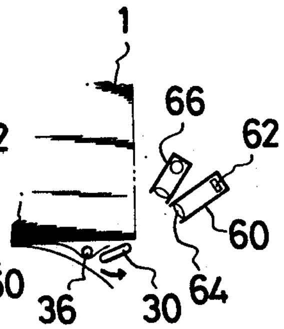
Figure 5:
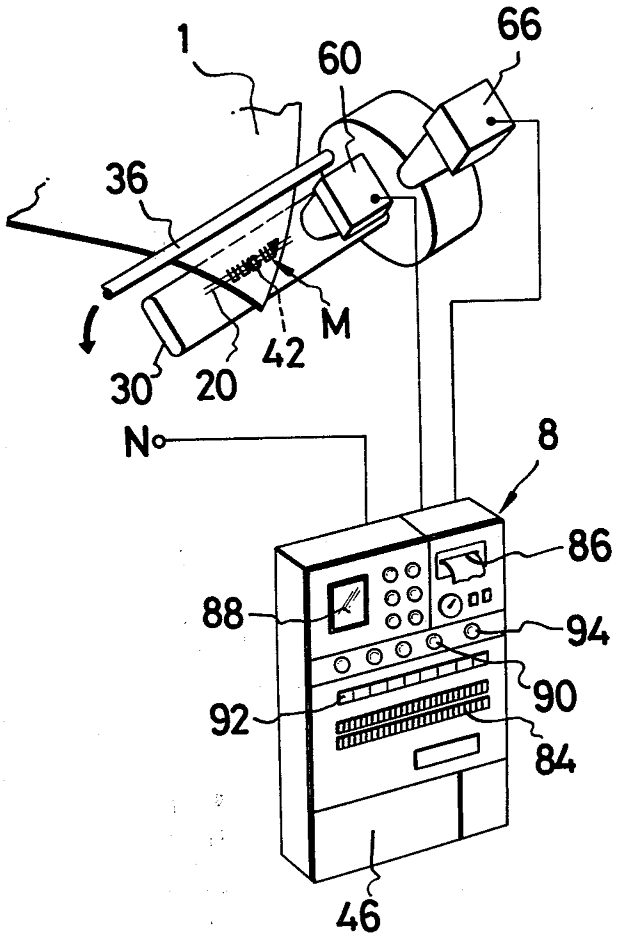
FIG. 5 is a schematic illustration showing a system scanning a check mark at the corner of a printed sheet according to the invention.

Through the suction blade 30 is provided a suction hole 42 which communicates with vacuum system (not shown). The suction hole 42 is formed on a blade surface 32 contacting with the corner of the printed sheet matters 1. As shown in FIGS. 2 to 4, the suction blade 30 attracts one by one the printed sheet matters 1 on the blade surface 32 at the suction hole 42, and particularly as shown in FIG. 3, the suction blade 30 turns clockwise and has an action which turns the mark M provided on the corner of the printed sheet matters 1 towards a direction of a density signal generator 60.

Figure 6:
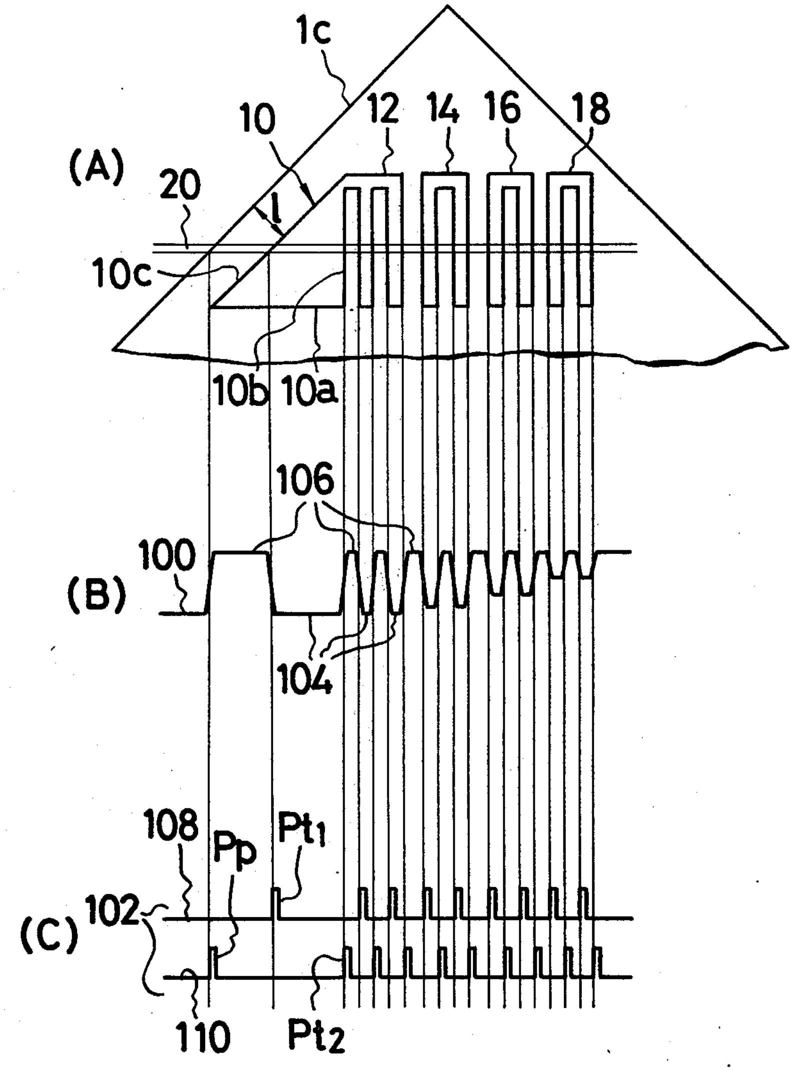
FIG. 6 is a schematic illustration showing the relationship between a check mark, density signal and pulse signal.
Figure 9:
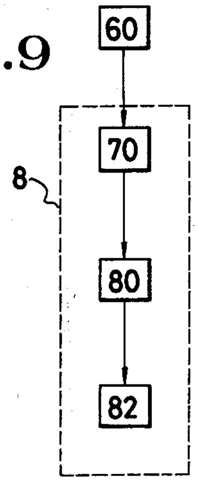
FIG. 9 is a block diagram showing the entire apparatus of the invention.

Thus, the counting machine N separates positively one by one the piled printed sheet matters 1 and upon the separation the check mark M is turned towards the direction of the density signal generator 60 which includes a photoelectric element 62 (an image sensor in this embodiment). The density signal generator 60 operates to focus an image of the check mark illuminated by a strobe light source 66 on a surface of the photoelectric element through a lens 64, to scan the check mark and to obtain a density signal 100 (i.e., one-dimensional video signal) corresponding to optical density of the check mark M (FIG. 6). The density signal from the density signal generator 60 is transmitted, as shown in FIG. 9, to a density signal processor 70 in which the density signal is analyzed and processed, and is converted to a pulse signal which shows positions of the stripes 12, 14, 16 and 18, that is, the initial and final positions of a printing area of each stripe. The pulse signal then, is fed to a computer 80 which checks the missing print and the shear in printing. An indicator 82 indicates the checked result, that is, the printed matter which has the missing print and the shear in printing. In FIG. 9, reference numeral 8 shows a check control machine which is provided with the signal processor 70, the computer 80, the indicator 82, a control mechanism for controlling the entire apparatus, operation board or the like.

Figure 8:
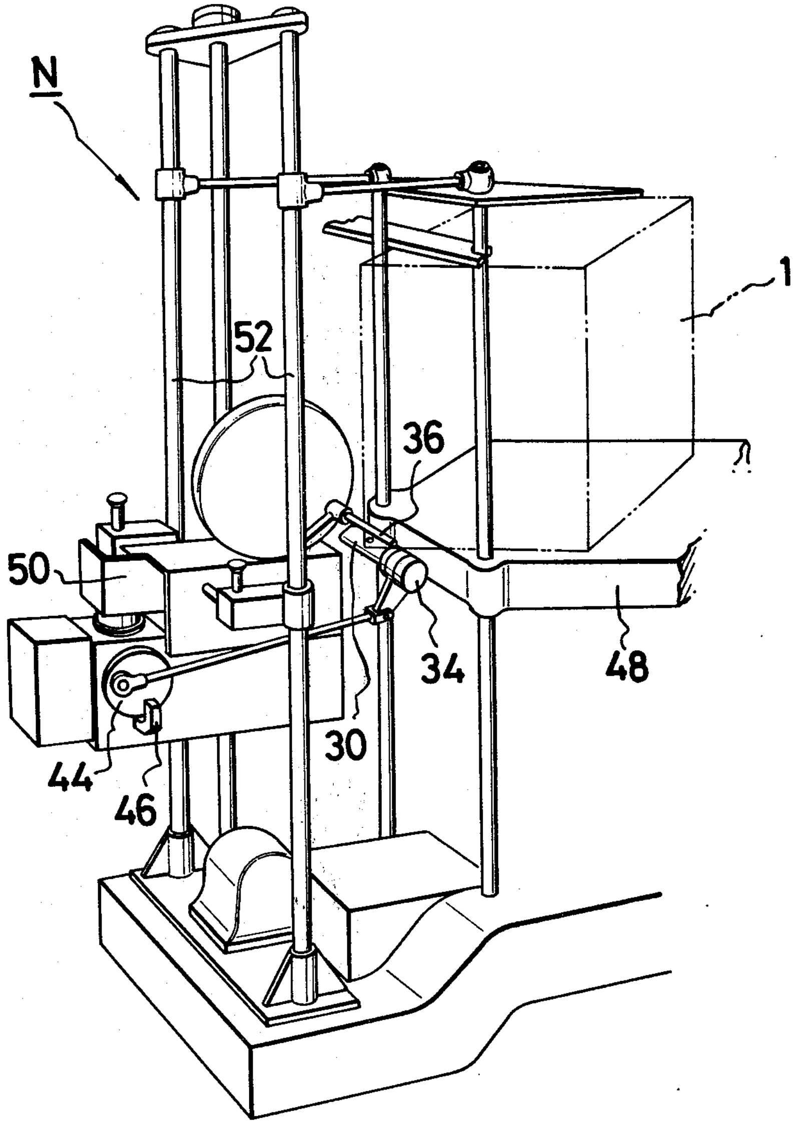
FIG. 8 is a perspective view showing an essential part of a counting machine according to the invention.

Hereupon, the strobe light source 66 causes the flash to synchronize with motion of the suction blade 30 by a synchronous signal generator 46 which is constituted, for example, by a proximity switch and which is provided opposite to a crank mechanism 44 which rotates the suction blade 30 repeatedly (FIG. 8).

Accordingly, the scanning of the check mark and the check of the printed matters with the obtained density signal are carried out by the flash of the strobe light source which synchronizes with the operation separating the printed matters by the suction blade 30, the density signal generator 60 corresponding to the flash, the computer 80 and the indicator 82.

Further, the counting machine N is utilized as a well known machine, and the suction blade is adapted to carry out the check of the printed sheet matters 1 piled on a table 48, from the lower part towards the upper part successively as shown in FIG. 8. For this, the counting machine N has a mechanism by which a counting mechanism 50 rises successively along guides 52, in response to the check. Further, although a counting machine N usually indicates the number of sheets, the counting machine N of the present invention does not require the typical means for indicating the number of sheets since the indication of number of sheets is carried out by the indicator 82.

Also, the wiper pin 36 provided opposite to the suction blade 32 has a mechanism which rotates successively towards the arrow direction around the suction blade 30 parallel to the latter, and as shown in FIG. 4, actuates to move down the printed matter 1, on which the check mark has been inspected in the density signal generator 60, beneath the suction blade 30 in synchronizing with each of the above motions whereby the next paper surface to be inspected is transferred successively on the blade surface 32 of the suction blade 30.

As mentioned above, the printed sheet matters are positively separated one by one by the counting machine N, and upon this separation, the check mark M is scanned in the density signal generator 60 so as to obtain the density signal 100. The density signal 100, as shown in FIG. 6, consists of a printing area signal portion 104 corresponding to the printing area of the triangle pattern 10 and the stripes 12, 14, 16 and 18 of each color and a non printing area signal portion 106 corresponding to the density of base of the printed matters. The density signal 100 is fed to and processed in the density signal processor 70 thereby to obtain two pulse signals 108, 110. The signal 108 has a rising of the pulse at each transition from a non-printing area signal portion 106 to a printing area signal portion 104, and the pulse signal 110 has a rising of the pulse at each transition from a printing area signal portion 104 to a non-printing area signal portion 106. The pulse signals are fed to the computer 80 which performs an operation to determine whether there are pulses corresponding to the stripes of each color, thereby to inspect for missing print. Also, the shear in printing is inspected by performing an operation to determine an average position for the stripes of each color from the pulse signal corresponding to the stripes of each color, by performing an operation to determine the distance between an average position of stripes of the first color and an average position of stripes of the other colors, and further by performing an operation to determine whether the obtained distance is within a predetermined permissible limit or not. The function of the triangle pattern 10 is to perform an operation to determine the distance (l) from a pulse $P_p$ and a pulse $Pt_l$, thereby to perform an operation to determine the printed position of the first color on the printed paper and to inspect whether the printed position of the first color on the printed paper is within the determined limit. Further, as mentioned above, since software of the computer 80 is combined to inspect the shear in printing on the basis of the first color in this embodiment, it is necessary to discriminate the pulse group of the first color from the pulse groups of the other colors, and therefore in this embodiment the software is combined to discriminate them from each other by certifying existence of the pulse $Pt_l$.

Figure 7:
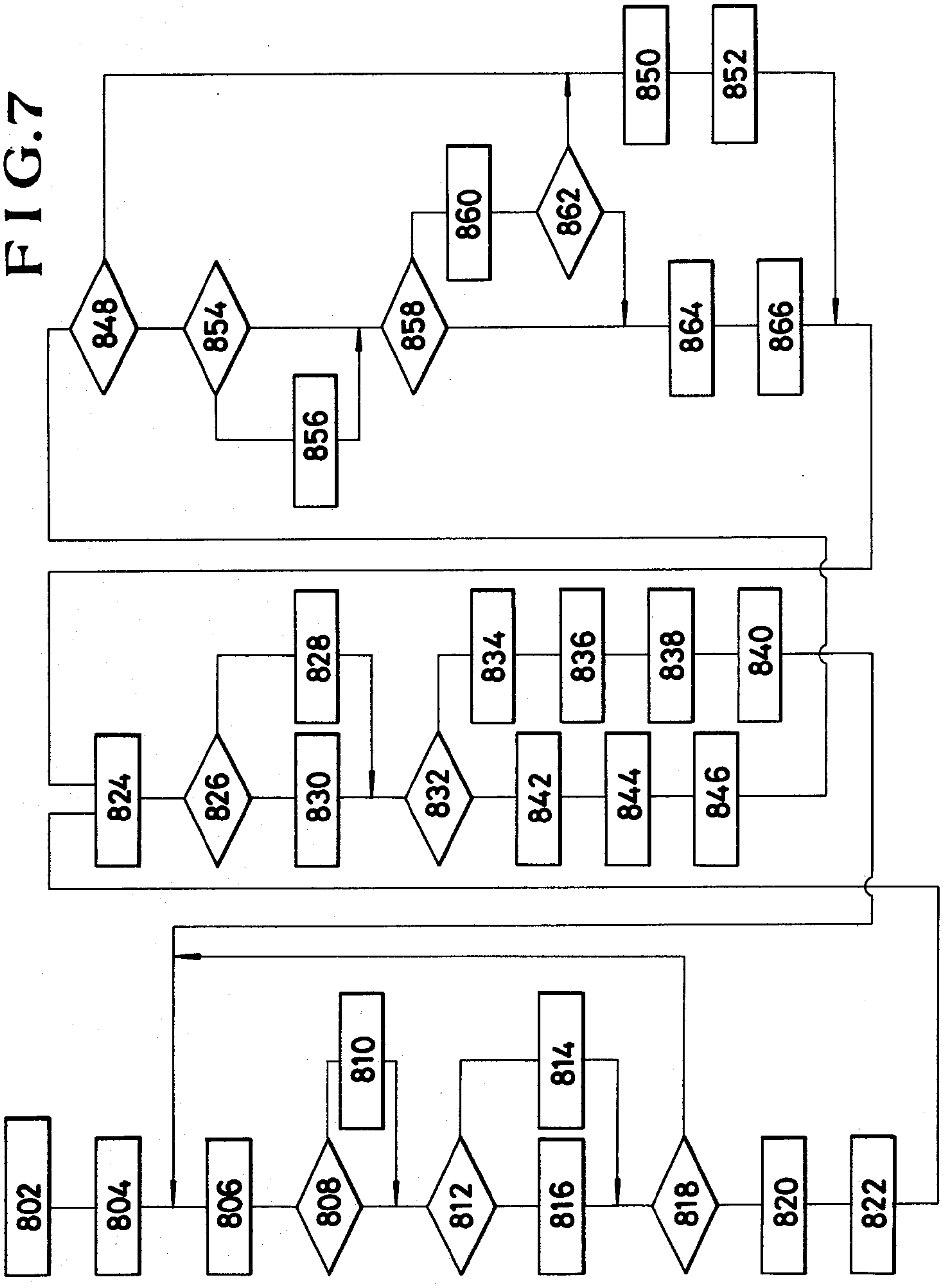
FIG. 7 is a flow chart showing software of a computer used in the invention.

FIG. 7 is a flow chart explaining one embodiment of operation software of a computer used in the method and apparatus for checking printed condition of printed sheet matters according to the present invention, and the printed condition will be inspected according to the following steps.

First, a power source is turned on at routine 802, and at routine 804, the previous instruction result indicated on the indicator 82 (see FIG. 6 and FIG. 9) is cleared.

Next, at routine 806, two conditions of inspection are read into the computer: first, that the printed matters are inspected only with respect to missing print or are inspected with respect to both missing print and shear in printing, and second that a standard value is obtained from a digital switch 84 described hereinafter or from the sixth printed matter from the bottom.

Decision 808 determines the ON or OFF state of a switch for printing the standard value. If the switch is ON, that is, if it is necessary to print the standard value on data paper, the standard value is allowed to be printed on the data paper at routine 810 with a typewriter 86 of the indicator (see FIG. 5). If the switch is OFF, that is, if it is not necessary to print the standard value on the data paper, the process is advanced to the next step.

Decision 812 determines the ON or OFF state of a switch for indicating the storage value or checked value. If the switch is ON, the storage value is indicated on the indicator 82 at routine 814. If the switch is OFF, the check value is indicated on the indicator 82 at routine 816 during inspection.

Decision 818 determines the presence of the check start signal from the counting machine N. If the check start signal is present, the process advances to the next step and if the signal is not present, the process is returned back to the routine 806.

The above processes are preparatory steps and each of their actions is repeated till the check start signal is fed to the counting machine N.

When the decision 818 receives the check start signal from the counting machine N, the process advances from the decision 818 to routine 820 in which action is performed to turn off an end indicating lamp 94 of the indicator 82 indicating the end of the former check cycle and to clear the former data.

As the clear finishes, the title of the printed sheet matters to be inspected is printed on the data paper at the routine 822 with the typewriter 86 provided in the indicator 82.

As the printing of the title finishes, a basic data signal is read in from the digital switch 84 for setting the standard value in the indicator 82.

At decision 826, a determination is again made of the ON or OFF state of the switch for indicating the storage value. If the switch is ON, the process advances to a routine 828 for causing the indicator 82 to indicate the standard storage value stored at routine 856 described hereinafter, and if the switch is OFF, the process advances to a routine 830 for causing the indicator 82 to indicate the measured value inspected before one sheet.

Decision 832 determines the presence of a check end signal from the counting machine N. If the check end signal is present, the process advances to routines 834, 836, 838 and 840 described hereinafter, and if the signal is not present, the process advances in turn to a routine 842 for reading in data signals, an arithmetic routine for operating the data, and a data check routine 846 which compares the operation value in the arithmetic routine 844 with the above standard value and which checks whether the data is within the permitted limit of the standard value.

If missing print is judged at the decision 848, the process advances to a routine 850 at which the piled position of the printed matter having the missing print, that is, a position that the printed matter exists in what number from the bottom of the printed sheet matters, is counted. Routine 852 functions to turn on a lamp 90 for indicating faulty articles and a buzzer (not shown) for informing of faulty articles and gives a signal for discharging boundary papers to the counting machine N to insert the boundary paper into the piled position of the faulty printed matters with a mechanism for discharging boundary papers provided in the counting machine N.

Then, the process is returned back to the routine 824 to inspect the next printed matter to be inspected.

Further, the buzzer for informing of faulty articles is turned off automatically after one second with a timer.

If no missing print is judged at the decision 848, the process advances to decision 854.

Decision 854 determines ON or OFF state of a memory switch. If the switch is ON, the process advances to routine 858 after storing into a memory routine 856 a signal which is processed from the density signal of the mark N on the printed matter of the sixth sheet from the bottom, and if the switch is OFF, the process advances directly to the decision 858.

In the above description, the data stored at the routine 856 is the signal which is processed from the density signal of the check mark M on the printed matter of sixth sheet from the bottom. Although it would appear ideal to obtain this basic signal from the lowest of the printed sheets, it is easy for the lowest sheet to move out of position upon mounting the stack of printed matters on the counting machine N. Accordingly, it will be understood that the sheet from which the basic signal is obtained is not limited to the sixth sheet if it exists near the sixth sheet.

Decision 858 determines the ON or OFF state of a switch which switches presence of need for inspecting the shear in printing. If the switch is ON, the process advances to decision 862 after checking the data stored in the memory routine 856 and the data of the said printed matter, at a check routine 860.

If the presence of shear in printing is judged at the decision 862, the process follows the path of the previously described case where a faulty article exists, that is, it passes through the sheet number count routine 850 as in the case where the missing print exists.

If no shear in printing is judged at the decision 862, the flow advances to a routine 864 and the indicator 82 is caused to turn off the fault indicating lamp 90, in the event the lamp is lit due to a faulty article being counted before the present sheet. Of course, if lamp 90 is OFF as a result of having not counted a faulty article, the lamp remains in the OFF state.

A routine 866 counts in order from the bottom of the piled printed matter showing no faulty articles and the flow is turned back to the routine 824 for reading in the standard value in order to inspect the next printed matter to be inspected.

When the check is finished in respect to all of the printed sheet matter and the check end signal is fed to the decision 832 from the counting machine N, data is made to print on the data paper with the typewriter 86 at each routine, that is, the total sheet numbers at the sheet number printing routine 834, the faulty cause of the faulty printed matter, i.e., missing print or shear in printing at the routine 836 for printing faulty article data, the condition taken for check at the routine 838 for printing check condition, and the standard value used for check at the routine 840 for printing standard value.

When all of the above printing finished, the flow returns back to the 806 and the action of the preparatory steps is repeated till a check start signal of the printed sheet matter to be next inspected is fed to the 818.

Turning back to FIG. 5, reference numeral 86 identifies a typewriter for indicating data, such as the number of the checked sheet, the missing print, the printing matter having the shear in printing, or the like; 88 denotes a cathode-ray tube for visually indicating various signals, such as the density signal 100 or the like; 84 denotes a digital switch for manually setting the standard value, the permitted limit or the like; 92 denotes an electric light indicator for indicating the setting value at digital switch 84, shear in printing or the like; 94 denotes an end indicating lamp; and, 90 denotes a lamp for indicating faulty articles.

Further, it will be understood that the software for check in the invention may be suitably combined according to the object of check, the precision of check or the like without limiting it to the above embodiment.

According to the method and apparatus of the invention as mentioned above, there are outstanding characteristics as shown below. Since the apparatus is constituted to separate one by one printed matter piled on the counting machine and to scan a check mark provided on the corner of the printed matter upon the separation to obtain the density signal, the counting machine separates positively the printed matters one by one and is not to turn over two sheets at the same time. Accordingly, no possibility causes the printed matter to be not inspected.

Since the inspection of the printed matters can be performed at the same time with the count, the working force and time of these works are substantially similar to that of the conventional count and workability can be remarkably improved because of it being possible to omit the various conventional inspections by register mark.

Further, the check mark consists of stripes, and since the inspection of the printed matters is performed to convert the density signal obtained by scanning the stripes into the pulse signal which is operated upon by the computer, the inspection is very high in precision and reliability as compared with the various conventional inspections. Particularly, the system will not inspect a faulty article and indicate it as a good article, and as previously mentioned, there is no possibility for skipped sheets during the inspection of the printed matter.

Figure 10:
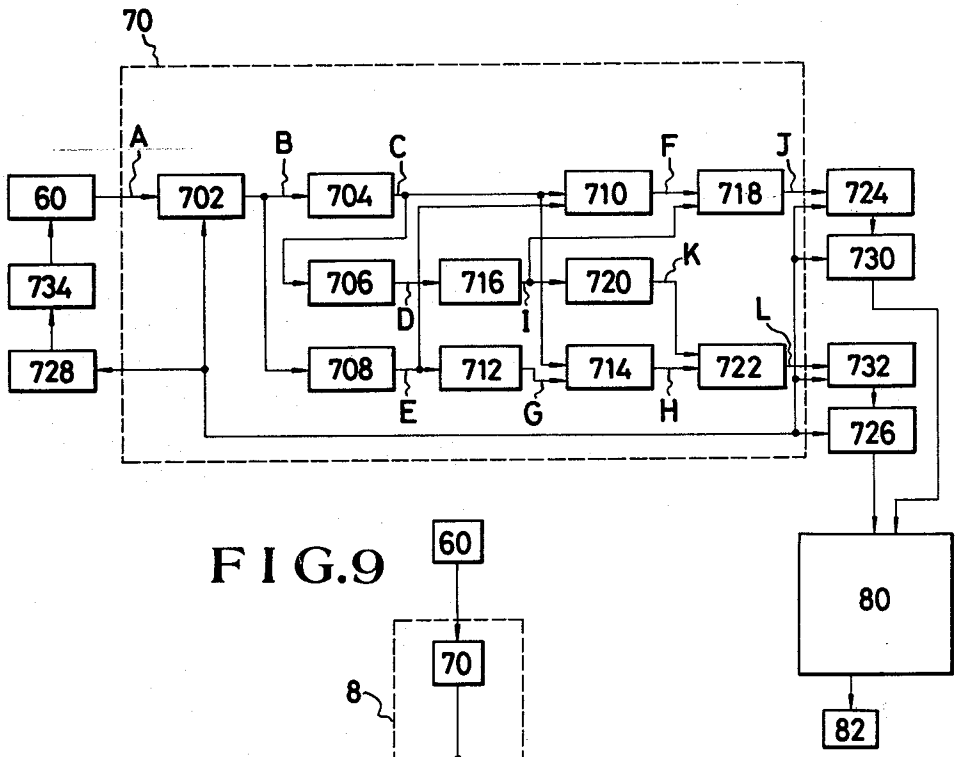
FIG. 10 is a block diagram of the signal processor.
Figure 11:
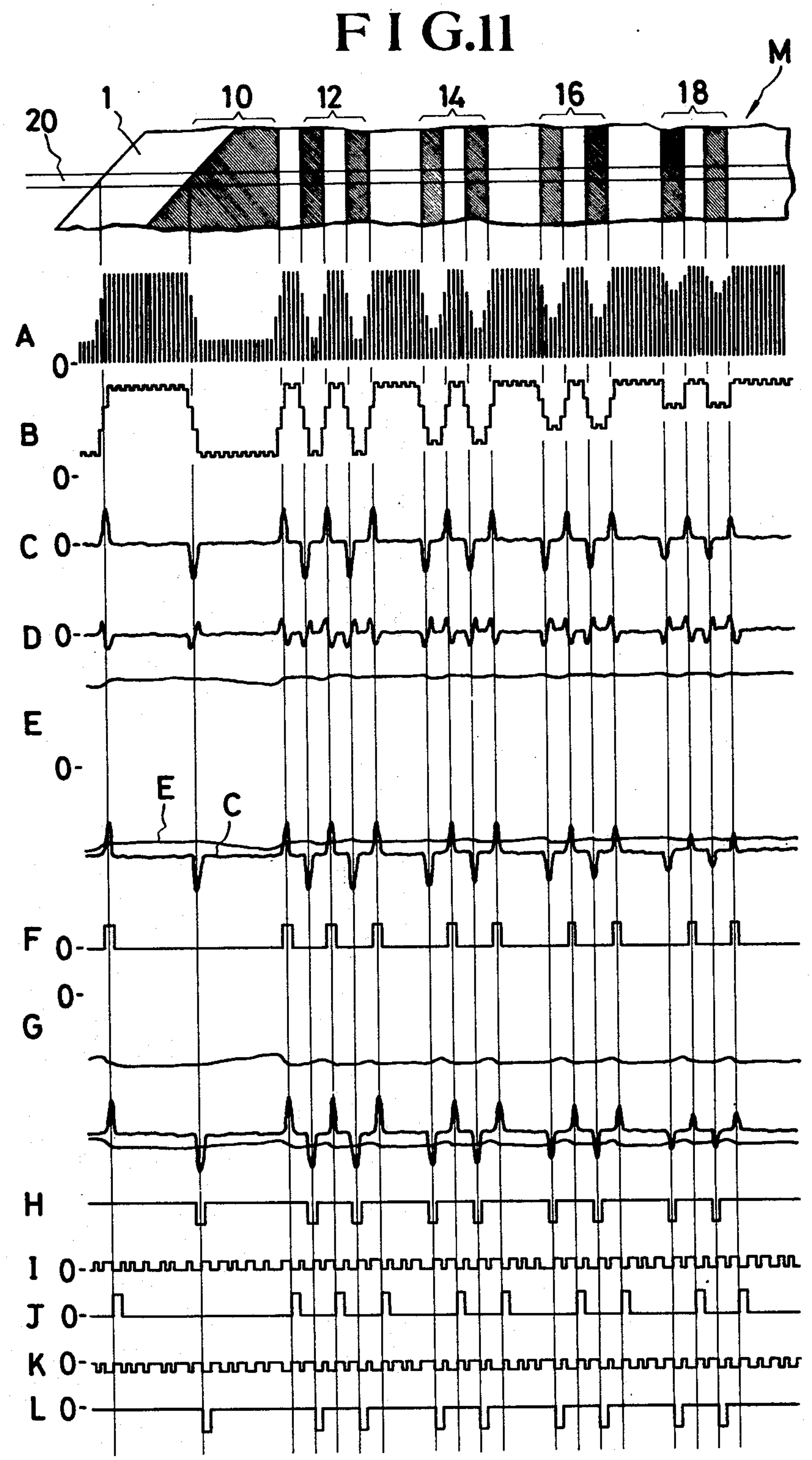
FIG. 11 is a diagram showing characteristics of the output signals provided by each circuit shown in FIG. 10.

FIG. 10 is a block diagram showing detail of the density signal processor 70, and FIG. 11 shows each of the signal output wave forms in the density signal processor. A sample and hold circuit 702 sample holds a density signal A from an image sensor of a density signal generator 60 to convert it into a density signal B having an envelope wave form. A primary differentiation circuit 704 differentiates the density signal B to convert it into a first differentiation signal C. A secondary differentiation circuit 706 further differentiates the primary differentiation signal C to convert it into a secondary differentiation signal D. A peak rectifier circuit 708 rectifies a peak value of the density signal B to convert it into a peak rectifying wave form signal, that is, a base density signal E showing the density of the base (non-printing area) of the printed matters. A comparator circuit 710 clips only the positive-going side of the primary differentiation signal C by taking as an input the primary differentiation signal C and the base density signal E and obtains boundary portion signal F of transitions from the printing area of the stripes to the base. A signal inverting circuit 712 is adapted to obtain a base density signal G which is an inverted version of the base density signal E. A comparator circuit 714 clips only the negative-going side of the primary differentiation signal C by taking as an input the primary differentiation wave form signal C and the signal G which in the inverted base density signal, and obtains a boundary portion signal H of transitions from the base to the printing area of the stripes. A clipper circuit 716 clips the secondary differentiation signal D at a zero level and obtains a boundary point signal I showing a wave peak of the primary differentiation signal having the most acute change, namely, including a pulse which ends in a point of the most acute change upon transferring from the printing area portion to the base. One shot multivibrator circuit 718 takes as a primary input the boundary portion signal F of the positive-going comparator circuit 710 and as a secondary input the boundary point signal I, and obtains an output pulse signal rising from the position of each positive-going peak of the primary differentiation signal C, that is, a pulse signal J showing a point which has the most acute change of density and which is a transition from the printing area to the base. A signal inverting circuit 720 obtains a boundary point signal K which is an inverted version of the boundary point signal I. One shot multivibrator circuit 722 takes as a primary input the boundary portion signal H of the negative-going comparator circuit 714 and as a secondary input the boundary point signal K, which is the inverted boundary point signal I, and obtains an output pulse signal rising from the position of each negative-going peak of the primary differentiation signal C, that is, a pulse signal L showing a point which has the most acute change of density and which is a transition from the base to the printing area. Shift resistors 724 and 726 take as their inputs the output pulse signals J and L and take as a shift pulse a clock pulse from a clock pulse generator 728 so as to shift periodically the output pulse signals J and L. Latch circuits 730 and 732, which take as their inputs the outputs of the shift resistors 724 and 726 and the clock pulse, feed the output pulse signal to a computer 80. A driver circuit 734 of the density signal generator 60 takes as its input the clock pulse of the clock pulse generator.

By feeding the pulse signals J and L to the computer 80, it operates, as previously described, to inspect for presence of pulses corresponding to each color, to determine the distance of each of the pulses corresponding to the other colors from the pulse of the first color and whether the distance is within the permitted limit, to detect the missing print and shear of the printed matters, and indicate them on an indicator 82 provided in a check control machine 8 whereby the printed matter having the missing print and shear is indicated.

Figure 13:
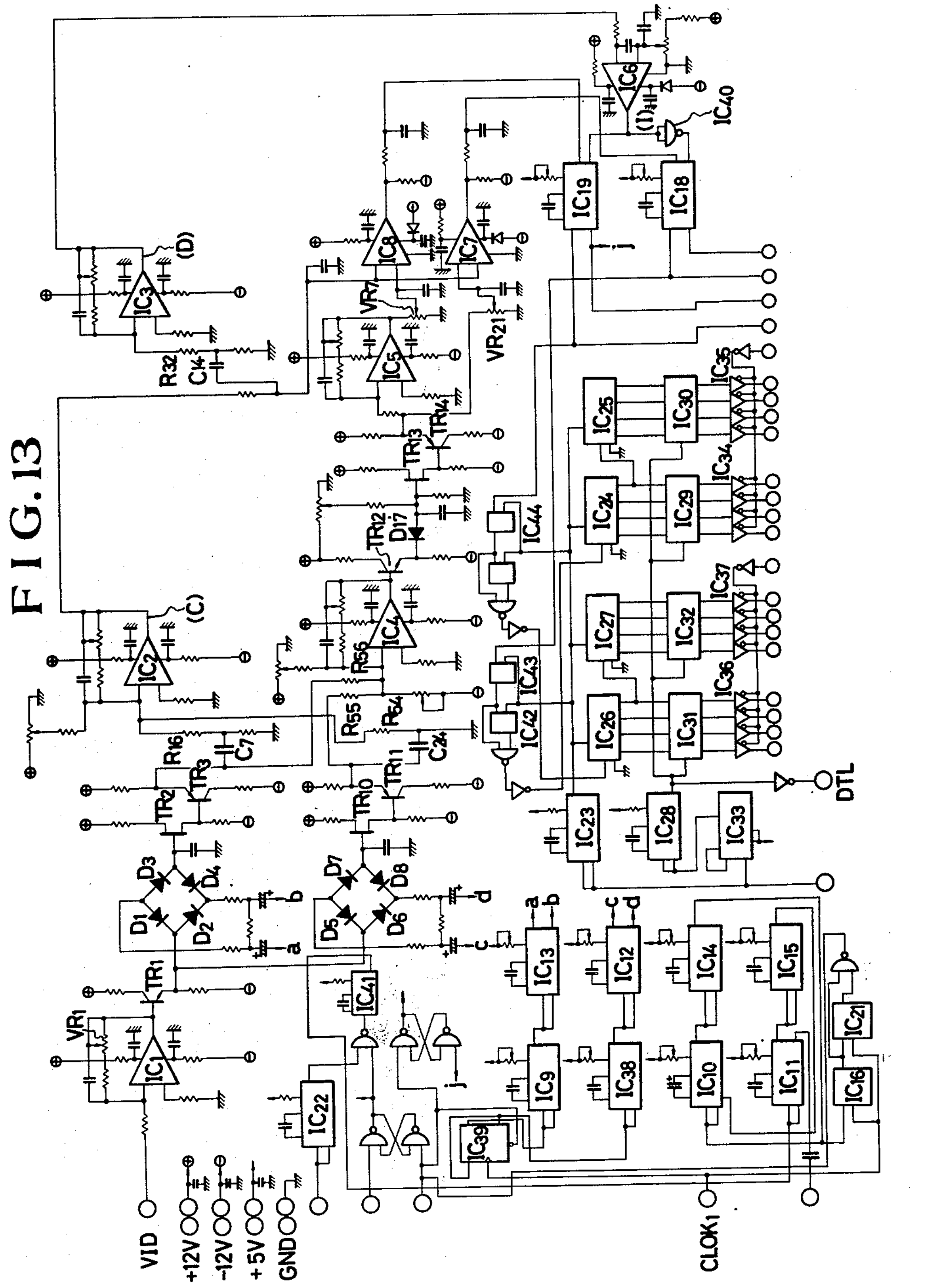
FIG. 13 is a circuit diagram showing one embodiment of the signal processor.

FIG. 13 shows a circuit of the signal processor 70 and the following description will be made about operation of the circuit.

A density signal from the density signal generator 60 is fed from a "VID" terminal and is amplified at $IC_1$(LM 318). The amplification degree is adapted to obtain an output of about 2V adjusted by VR1 (A of FIG. 11). The output of $IC_1$ is applied to two gate circuits $D_1$–$D_4$ and $D_5$–$D_8$ through an emitter follower of TR1. To these gate circuits is applied gate pulses synchronizing with a clock signal of the density signal generator 60 formed in $IC_9$, $IC_{13}$, and $IC_{38}$, $IC_{12}$. The gate pulses are obtained by counting down the clock signal for the density signal generator applied to "CLOKI" to ½ frequency in $IC_{39}$ and further shaped in the $IC_9$, $IC_{13}$ and $IC_{38}$, $IC_{12}$ are synchronized with even numbers and odd numbers of the clock signal. A reason for having two gate circuits is to reduce periodic noise in the output signal of the density signal generator 60. The signal passing through the gate circuits of $D_1$–$D_4$ and $D_5$–$D_8$ are sampled and held in $TR_2$, $TR_3$, and $TR_{10}$. The two signals (B of FIG. 11) sample held are combined at $R_{55}$ and $R_{56}$ and after amplifying suitably in $IC_4$ are fed to a peak rectifier circuit of $D_{17}$, $TR_{13}$ and $TR_{14}$ through an emitter follower on $TR_{12}$. The signal (E of FIG. 11) peak rectified in $D_{17}$, $TR_{13}$ and $TR_{14}$ is divided in two signals and one of them is suitably adjusted at $VR_{21}$ and is applied to a comparator $IC_7$ for differentiation wave form described hereinafter. The other one on the above signals is suitably adjusted at $VR_7$ after reversing its polarity in $IC_5$ and is applied to the other comparator $IC_8$ to provide a differentiation wave form.

The two signals sample held previously are combined by $IC_2$ after differentiating at $R_{16}$ and $C_{24}$, $R_{54}$ and are amplified. A differentiation wave form (C of FIG. 11) amplified into $IC_2$ is divided in two signals, and one of them is applied to the comparators $IC_7$ and $IC_8$ for differentiation and then application to one shot multivibrators $IC_{19}$ and $IC_{18}$ after positive and negative-going clipping with the peak rectifying wave form (F of FIG. 11). The other signal is applied to a clipper $IC_6$ for a secondary differentiation wave form after again differentiating with differentiation circuit $C_{14}$, $R_{32}$ and amplifying (D of FIG. 11) in $IC_3$. The voltage is clipped on a line of about O V and this is directly applied to $IC_{19}$ (I of FIG. 11). The above signal from $IC_6$ is also applied to $IC_{18}$ after being reversed in polarity by $IC_{40}$.

Inputs of the one shot multivibrator of $IC_{19}$ and $IC_{18}$ are AND circuits and generate pulses (J of FIG. 11) of a fixed width by synchronizing with rising or lowering of the secondary differentiation wave form in the wave form which clipped the primary differentiation wave form. Since periodic position and width of the pulses are irregular, they are fed to shift registers of $IC_{26}$, $IC_{27}$ and $IC_{24}$, $IC_{25}$ after converting them to signals of one clock width synchronizing to the clock signal at $IC_{42}$, $IC_{43}$ and $IC_{44}$.

Each of the shift registers has a capacity of 8 bits and therefore permits latch circuits of $IC_{31}$, $IC_{32}$, $IC_{29}$ and $IC_{30}$ to actuate every 8th clock pulse by a ⅛ counter of $IC_{33}$ and in this time permits the computer side to start from a "DTL" terminal whereby the data in the shift register is fed into the computer through $IC_{36}$, $IC_{37}$, $IC_{34}$ and $IC_{35}$. $IC_{23}$ and $IC_{28}$ are provided to form pulses for driving the shift register and latch circuits. $IC_{10}$, $IC_{11}$, $IC_{14}$, $IC_{15}$, $IC_{16}$, $IC_{21}$, $IC_{22}$, $IC_{41}$ are circuits provided to generate signals used to scan the density signal in synchronization with the counting machine and to flash the strobe light.

The check control machine 8 is provided with, as previously described, the signal processor 70, the computer 80, the indicator 82, the mechanism for controlling the entire apparatus, the control board, or the like.

Figure 12:
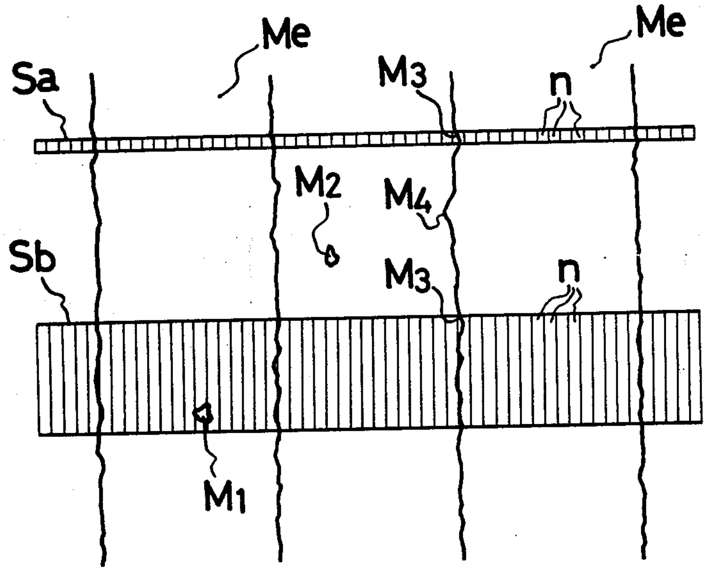
FIG. 12 is a schematic illustration showing relationship of narrow and wide scanning widths to image of stripe.

Described below is the reasoning employed in using the above circuits to process the density signal from the density signal generator 60. For this purpose, the description is made with respect to the density signal A obtained at the density signal generator 60. FIG. 12 is an illustration showing size of scanning width of a photoelectric element. The reference character Sa denotes a scanning width of the photoelectric element (image sensor) having a narrow width, Sb denotes a scanning width, of the photoelectric element having a wide width and further, Me denotes an image of a stripe of the check mark M forming image on the surface of the photoelectric element. Characters n, n, n, show unit light receiving elements of the photoelectric element.

The strips of each color of the check mark M are uneven at the boundary line between the base and the printing area by microscopic appearance, as shown in FIG. 12 and there are small white blanks $M_1$, spots $M_2$, lack portions $M_3$ and blots $M_4$. However, if these are picked up in the density signal it may cause an inspection error by judging a good article as a faulty article.

Accordingly, it is necessary to reduce if possible the noise generated by the above defects. In the case of scanning the second stripe from the left with the narrow scanning width Sa, the signal detects a deviation of the boundary line when the lack portion $M_3$ or the like enter into the scanning width. However, if the stripe is scanned by the wide scanning width Sb, the area that the lack portions or the like possess with respect to the entire width of the scanning width is reduced. More precise inspection is possible by scanning with a photoelectric having a wide scanning width Sb. In this embodiment, it has been found that the generated noise is remarkably reduced by using a photoelectric element having a scanning width of 17 mils.

The density signal processor 70 is used to provide output pulse signals J, K derived from the density signal A from the density signal generator 60, that is, a signal for exactly indicating positions of ends of both sides of each stripe. The density signal processor 70 is operative by the above mentioned circuits to detect as the boundary between the printing paper base, non-printing area and each stripe a portion having the most acute change of level of the density signal A as a signal for indicating the position of each stripe. More specifically, in order to obtain an output pulse for indicating only the portion having the most acute change of level of the density signal A, the sample hold circuit 702 sample holds the density signal A therein and provides as an output the envelope wave form of density signal B, which thereafter is differentiated to obtain the differentiation signal C. Upon clipping the signal C at the comparators 710 and 714, the base density signal E obtained by peak rectifying the density signal B is set as a clipping level in order to automatically correct scatter of flash from the strobe light source 66, a change occurring from the color of the printing paper and aberration of the lens. However, since the most acute change of level, i.e., the boundary point, cannot be detected solely by the boundary portion signal F obtained in clipping the primary differentiation signal C, the boundary point signal I is obtained by clipping at zero level the signal D which is a differentiated version of the primary differentiation signal C. The one shot multivibrators 718 and 722 then are permitted to operate with the signal I used as a trigger pulse whereby output pulse signals J and L having a fixed width are obtained, which have rise times coinciding with the peak values of the signal C the primary differentiation wave form, that is, the portions having the most acute change of density of the density signal. By determining the output pulse signal as a boundary point between the printing paper and each stripe, it has been found that the inspection can be performed in every high precision.

As mentioned above, according to the present invention, the apparatus can give completely and exactly a position having the most acute change of density between the printing area of the check mark of the density signal and the base, while separating one by one multicolor printed sheet matters with the counting machine, by means whereby light illuminates the check mark provided on the corner, and the check mark is scanned by the photoelectric element to provide a density signal of the check mark whereby the printed condition of the multicolor printed sheet matter is inspected. Accordingly, the missing print and shear in printing can be inspected in very high precision and positively with the computer or the like.

The following description will be made in respect to details of the above check mark with reference to one embodiment.

In FIG. 6, a check mark M comprises four sets of stripes 12, 14, 16 and 18 corresponding to four printing colors of black, cyan, magenta and yellow, and a triangle pattern 10. The stripes 12, 14, 16 and 18 are provided at right angles to a scanning line 20. The stripes 12, 14, 16 and 18 are divided into two stripes for each printing color, that is, into each two stripes of 12, 12, 14, 14, 16, 16, 18 and 18.

The triangle pattern 10 is the same color with that of the primary stripes 12, that is, black and is printed at the same time with the first stripes. The printed position of the triangle pattern 10 is decided by arranging a first side 10*a* parallel to the scanning line 20, a second side 10*b* at right angles to the scanning line 20, and a third side 10*c* parallel to an opposing side 1*c* of the printed matter.

It will be understood from the previous description in respect to the inspection of the printed condition of the printed sheet matters providing check mark M as mentioned above on the corner.

The check mark M of the present invention is scanned at the density signal generator 60 to perform inspection when turning over the corner of the printed matter piled by the counting machine N one by one with the suction blade and the wiper pin. Accordingly, since the suction blade 32 and the wiper pin 40 are at 45° to the side of the printed matter 1, the check mark M is provided on the corner of the printed matter so that the scanning direction is about 45° to the side of the printed matter. Also as shown in FIG. 4, the turned over area of the printed matter, in other words, the area which is exposed for scanning the mark, is very small. Therefore, the check mark must be provided near the side of the printed matter and in a position capable of being printed within a 1′ margin from the edge of the printed matter. According to the condition as mentioned above, the check mark M is provided on the corner of the tail end of the printed matter so that the scanning line 20 is at about 45° to the side of the printed matter and since the exposing area of the printed matter, upon scanning is small, the length of the scanning line is very short.

Accordingly, the number and width of the stripes for each color are limited. With respect to the number of the stripes, for many experiences, it has been obtained that when the inspection is made by operation of the computer, the inspection is sufficient if the shear in printing is judged as the printed position of the stripe the average position obtained from 4 data for each color. In the stripes of the check mark, lack portions $M_3$, bolts $M_4$, white blanks $M_1$ and spots $M_2$ of printing area often occur because of dust adhering on a printing plate. If these are picked up by the density signal generator, the signals generated by the defects must be removed as noise so as to prevent the properly printed matter from being judged as faulty matter. However, if a datum is deviated by the lack portion $M_3$ the inspection can be exactly performed fully by averaging the datum with the other three data. Accordingly, if two stripes are adopted for each color, since two data are obtained for one stripe, the data make a total of 4 and the sufficient inspection is possible.

The description will be next made in respect to width of the stripes. The stripe having too wide width is not proper because the length of the scanning line is short as previously mentioned. However, the stripe which is narrow too causes a fear that the stripe may be not detected when the lack portion $M_3$ or the white blank $M_1$ exists on the scanning line. Considering the resolving power of the photoelectric element in the density signal generator 60, the stripes are sufficient at a width of more than 0.2 mm, preferably, 0.3 mm and it has been confirmed that a width of more than 1 mm is not necessary. In this embodiment, the stripes are adopted at a width of 0.5 mm.

The following description will be made in respect to a triangle pattern 10.

First, a side 10*a* does not have meaning in respect to check function and only closes the other two sides 10*b* and 10*c* of the triangle. The side 10*b* is necessary to discriminate the primary color stripe from the stripes of other colors since in this embodiment the inspection software is combined to perform inspection of the other color on the basis of the primary color. In the software of this embodiment, by detecting the side 10*b* the pulse of the primary color is discriminated from the pulse of the other colors.

The side 10*c* is parallel to the side 1*c* of the printed matter as previously mentioned and therefore is used to detect a distance (l) between the side 1*c* and the side 10*c*. The side 10*c* is a side used to judge the shear in print when there exists the shear in printing of the printed position of the primary color to the printed paper.

Figure 14:
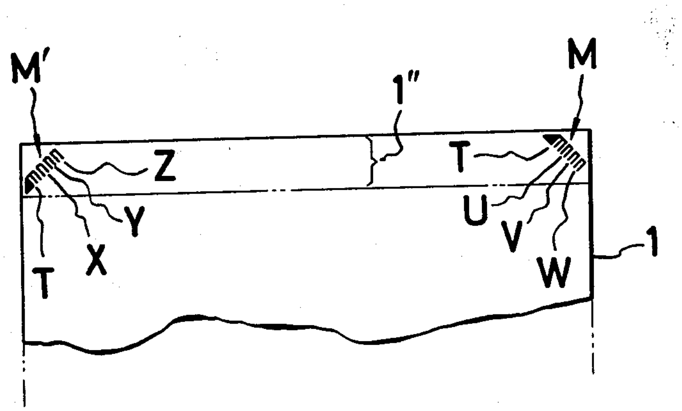
FIG. 14 is a schematic illustration showing the arrangement of check marks provided on multicolor printed sheet matters having more than five colors.

Thus, the stripe of the primary color and the triangle pattern have an important role in this embodiment, and also the software is easy to combine and the exact inspection is possible when taking the primary color on the basis of inspection judgement as in this embodiment. Accordingly, the inspection may be more exactly performed if the stripe of the primary color and the triangle pattern is taken as the color of highest density, that is, the color which is easy to detect because difference is large in the density signal. FIG. 14 shows a method for providing stripes in a case that the color to be inspected is more than five. In this case on one corner of the printed matter is provided a mark M comprising four stripes T, U, V, W corresponding to four colors and on the other corner of the printed matter is provided a mark M' comprising four stripes T, X, Y, Z. The stripe T is similar to the above stripe T and therefore corresponds to seven colors. Namely, the primary stripes of both the corner are stripes of common color and is selected from the color of the highest density as previously described.

Since the primary stripes are common to the two marks M and M', they inspect both the marks and inspection can be performed for the shear in printing among all of colors.

As described above, the mark for inspecting the printed condition according to the present invention can check its exact printed position because the inspection point according to the photoelectric element is four or six points by each color.

Also, since the points are enough even if lack portions, blots and white blanks exist in the check mark and dirt exists in the check marks, noise generated from them can be easily separated from the regular signal for indicating a position of the check mark.

Accordingly, the missing print and shear in printing of the multicolor printed sheet matters can be checked at the same time with count of the number of sheets, and the printed condition can be inspected economically without requiring manual steps.

What is claimed is:

1. A system for checking printed condition of multicolor printed sheet matters, said system comprising:
- a check mark on at least one corner of each of said sheet matters, said check mark including stripes corresponding to each color printed;
- a counting machine for separating said sheet matters one by one and exposing said corner having said check mark;
- a density signal generator comprising a photoelectric element which scans said check mark separated and exposed by said counting machine to provide as an output a density signal of the check mark;
- a density signal processor which analyzes and processes said density signal from said density signal generator to generate a pulse output which indicates the position of said stripes;
- a computer which is operative to inspect for presence of said pulse signal from said density signal processor to detect missing print; and
- an indicator which indicates the printed sheet matter having the missing print detected by said computer.

2. A system for checking printed condition of multicolor printed sheet matters according to claim 1, in which said counting machine has a movable suction blade, and said density signal generator comprises a photoelectric element which is an image sensor adapted to detect deflected light from the scanned matter when said matter is illuminated by a strobe light source which flashes in synchronization with the motion of said suction blade.

3. A system for checking printed condition of printed sheet matters according to claim 1, in which said density signal processor includes circuit means for obtaining a base density signal from said density signal, differentiation circuit means for obtaining a primary differentiation signal by differentiating said density signal, circuit means for obtaining a boundary portion signal by clipping the obtained primary differentiation signal with said base density signal, circuit means for obtaining a secondary differentiation signal from said primary differentiation signal, circuit means for obtaining a boundary point signal from the obtained secondary differentiation signal, and circuit means for obtaining an output signal to indicate a position at which density change is most acute between a printing area of the check mark and a base from said boundary portion signal and said boundary point signal.

4. A system for checking printed condition of printed sheet matters according to claim 1, in which said computer is further operative to inspect for any time lag of said pulse signal from said density signal processor to detect shear in printing, and said indicator further indicates the printed sheet matter having the shear in printing detected by said computer.

5. A system for checking printed condition of printed sheet matters according to claim 4, in which said density signal processor includes circuit means for obtaining a base density signal from said density signal, differentiation circuit means for obtaining a primary differentiation signal by differentiating said density signal, circuit means for obtaining a boundary portion signal by clipping the obtained primary differentiation signal with said base density signal, circuit means for obtaining a secondary differentiation signal from said primary differentiation signal, circuit means for obtaining a boundary point signal from the obtained secondary differentiation signal, and circuit means for obtaining an output signal to indicate a position at which density change is most acute between a printing area of the check mark and a base from said boundary portion signal and said boundary point signal.

6. A system for checking printed condition of multicolor printed sheet matters according to claim 4, in which said density signal generator is constituted to scan the check mark provided on the corner of each of the multicolor printed sheet matters by the photoelectric element having a predetermined scanning width to obtain the density signal.

7. A system for checking printed condition of multicolor printed sheet matters according to claim 1, in which said density signal generator scans all the stripes of said check mark with the photoelectric element thereof, and said density signal processor analyzes and processes the resulting density signal, including signals of all the printed colors.

8. A system for checking printed condition of multicolor printed sheet matters according to claim 5, in which said density signal processor uses as a base density signal a signal obtained in peak rectifying said density signal.

9. A system for checking printed condition of multicolor printed sheet matters according to claim 1, in which said check mark provided on the corner of the multicolor printed sheet matters includes straight stripes each having a width of from 0.2 to 1 mm, the stripes being arranged with a predetermined spacing, with at least two stripes for each of the printed colors, and oriented at right angles to a scanning line.

10. A system for checking printed condition of multicolor printed sheet matters according to claim 4, in which said check mark provided on the corner of the multicolor printed sheet matters includes straight stripes each having a width of from 0.2 to 1 mm, the stripes being arranged with a predetermined spacing, with at least two stripes for each of the printed colors, and oriented at right angles to a scanning line.

11. A system for checking printed condition of multicolor printed sheet matters according to claim 9, in which said scanning line is provided at about 45° to a side of the printed matter.

12. A system for checking printed condition of multicolor printed sheet matters according to claim 9, in which said check mark provided on the corner of each of said printed sheet matters has a pattern including a line parallel to a side of the printed matter, said line being arranged at a first scanning position of said scanning line.

13. A system for checking printed condition of multicolor printed sheet matters according to claim 1, in which said check mark comprises a printed pattern in which the number of boundary lines of said pattern printed in a primary color differs from the number of boundary lines of stripes printed in other colors, respectively.

14. A system for checking printed condition of multicolor printed sheet matters according to claim 13, in which said primary color of said check mark is of the highest density as compared to the other colors thereof, and said check mark pattern printed in said primary color comprises at least one straight stripe and a triangle.

15. In a system for checking printed condition of multicolor printed sheet matters, each of said sheet matters having on at least one corner thereof a check mark including stripes corresponding to each color printed, fault checking apparatus comprising, in combination:

- a counting machine for separating said sheet matters one by one and exposing said corner having said check mark;
- a density signal generator for scanning said check mark separated and exposed by said counting machine to provide as an output a density signal of the check mark;
- a density signal processor which analyzes and processes said density signal from said density signal generator to generate a signal output which indicates the position of said stripes;
- a computer which is operative to inspect for presence of said signal output from said density signal processor to detect missing print; and
- an indicator which indicates the printed sheet matter having the missing print detected by said computer.

16. Apparatus according to claim 15, in which said counting machine has a movable suction blade, and said density signal generator comprises a photoelectric element which is an image sensor adapted to detect reflected light from the scanned matter when said matter is illuminated by a strobe light source which flashes in synchronization with the motion of said suction blade.

17. Apparatus according to claim 15, in which said density signal processor includes circuit means for obtaining a base density signal from said density signal, differentiation circuit means for obtaining a primary differentiation signal by differentiating said density signal, circuit means for obtaining a boundary portion signal by clipping the obtained primary differentiation signal with said base density signal, circuit means for obtaining a secondary differentiation signal from said primary differentiation signal, circuit means for obtaining a boundary point signal from the obtained secondary differentiation signal, and circuit means for obtaining an output signal to indicate a position at which density change is most acute between a printing area of the check mark and a base from said boundary portion signal and said boundary point signal.

18. Apparatus according to claim 15, in which said density signal processor generates a pulse output signal which indicates the position of said stripes, and said computer is further operative to inspect for any time lag of said pulse signal from said density signal processor to detect shear in printing and said indicator further indicates the printed sheet matter having the shear in printing detected by said computer.

19. Apparatus according to claim 18, in which said density signal processor include circuit means for obtaining a base density signal from said density signal, differentiation circuit means for obtaining a primary differentiation signal by differentiating said density signal, circuit means for obtaining a boundary portion signal by clipping the obtained primary differentiation signal with said base density signal, circuit means for obtaining a secondary differentiation signal from said primary differentiation signal, circuit means for obtaining a boundary point signal from the obtained secondary differentiation signal, and circuit means for obtaining an output signal to indicate a position at which density change is most acute between a printing area of the check mark and a base from said boundary portion signal and said boundary point signal.

20. Apparatus according to claim 18, in which said density signal generator is constituted to scan the check mark provided on the corner of each of the multicolor printed sheet matters by the photoelectric element having a predetermined scanning width to obtain the density signal.

21. Apparatus according to claim 15, in which said density signal generator scans all the stripes of said check mark with the photoelectric element thereof, and said density signal processor analyzes and processes the resulting density signal, including signals of all the printed colors.

22. Apparatus according to claim 19, in which said density signal processor uses as a base density signal a signal obtained in peak rectifying said density signal.

* * * * *

UNITED STATES PATENT AND TRADEMARK OFFICE
CERTIFICATE OF CORRECTION

PATENT NO. : 4,165,465
DATED : August 21, 1979
INVENTOR(S) : Masataka Kanatani et al It is certified that error appears in the above-identified patent and that said Letters Patent are hereby corrected as shown below:

Column 1, line 10, "printing, (mis-registration), of multicolor" should read --printing (bad direction), mis-registration, of multicolor--;
line 50, "signal from" should read --signal, from--.
Column 5, line 26, "second that" should read --second, that--.
Column 6, line 35, "determines ON" should read --determines the ON--;
line 39, "mark N" should read --mark M--.
Column 7, line 19, "printing finished," should read --printing is finished,--.
Column 8, line 20, "obtains boundary portion" should read --obtains a boundary portion--;
line 27, "which in the" should read --which is the--;
lines 59-60, "shift periodically" should read --periodically shift--.
Column 9, line 17, "$D_5$-$D_8$ through" should read --$D_5$-$D_8$, through--;

Column 10, line 20, "a phote-" should read --a photoe- -- ;
line 25, "width and" should read --width, and--;

UNITED STATES PATENT AND TRADEMARK OFFICE
CERTIFICATE OF CORRECTION

PATENT NO. : 4,165,465

DATED : August 21, 1979

INVENTOR(S) : Masataka Kanatani et al

It is certified that error appears in the above-identified patent and that said Letters Patent are hereby corrected as shown below:

Column 10, line 29, "strips" should read --stripes--;
line 62, "sample hold" should read --sample and hold--.
Column 11, line 14, "C the primary" should read --C primary--.
Column 12, line 4, "a 1' margin" should read --a 1" margin--;
line 8, "matter and" should read --matter, and--;
line 9, "matter, upon" should read --matter upon--;
line 13, "for many" should read --from many--;
line 19, "$M_3$, bolts $M_4$" should read --$M_3$, blots $M_4$--.
Column 13, line 62, "deflected" should read --reflected--.

Signed and Sealed this

*First* Day of *April 1980*

[SEAL]

*Attest:*

SIDNEY A. DIAMOND

*Attesting Officer* *Commissioner of Patents and Trademarks*